June 28, 1960  H. W. MOORE  2,942,793
MULTIPLE COIL WINDING MACHINE
Filed April 12, 1957  5 Sheets-Sheet 1

INVENTOR.
HARRY W. MOORE
BY
HIS ATTORNEYS

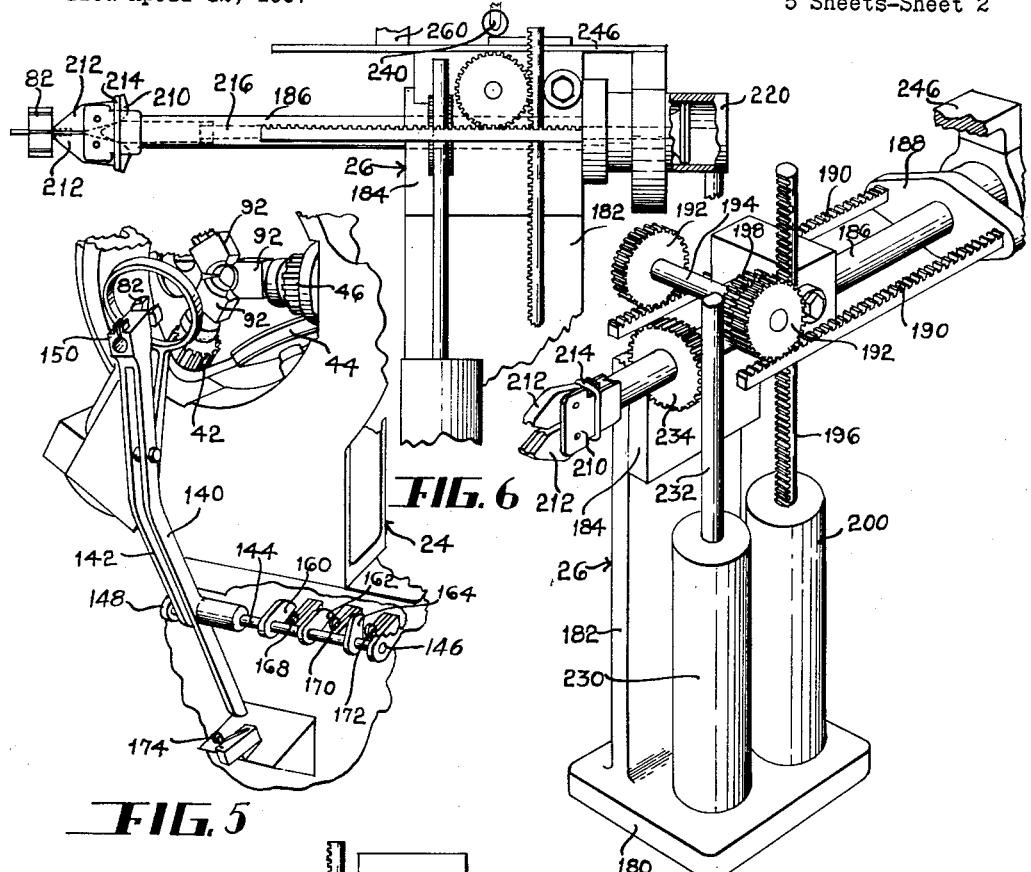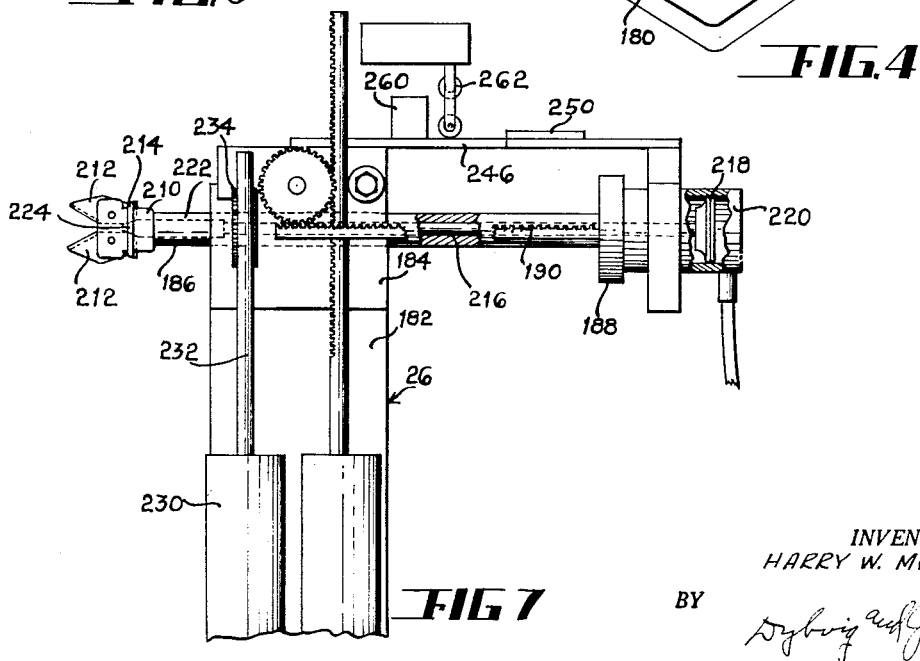

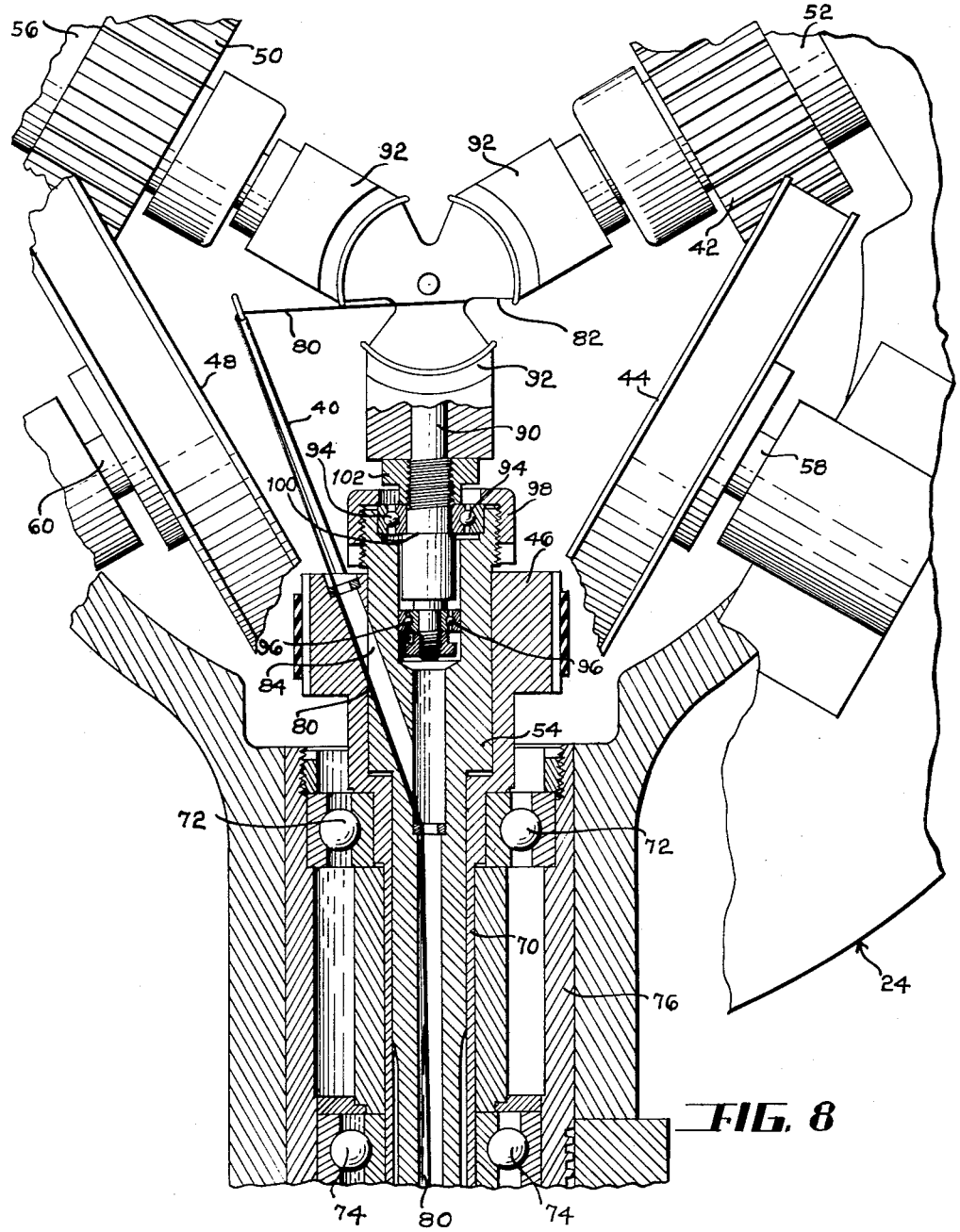

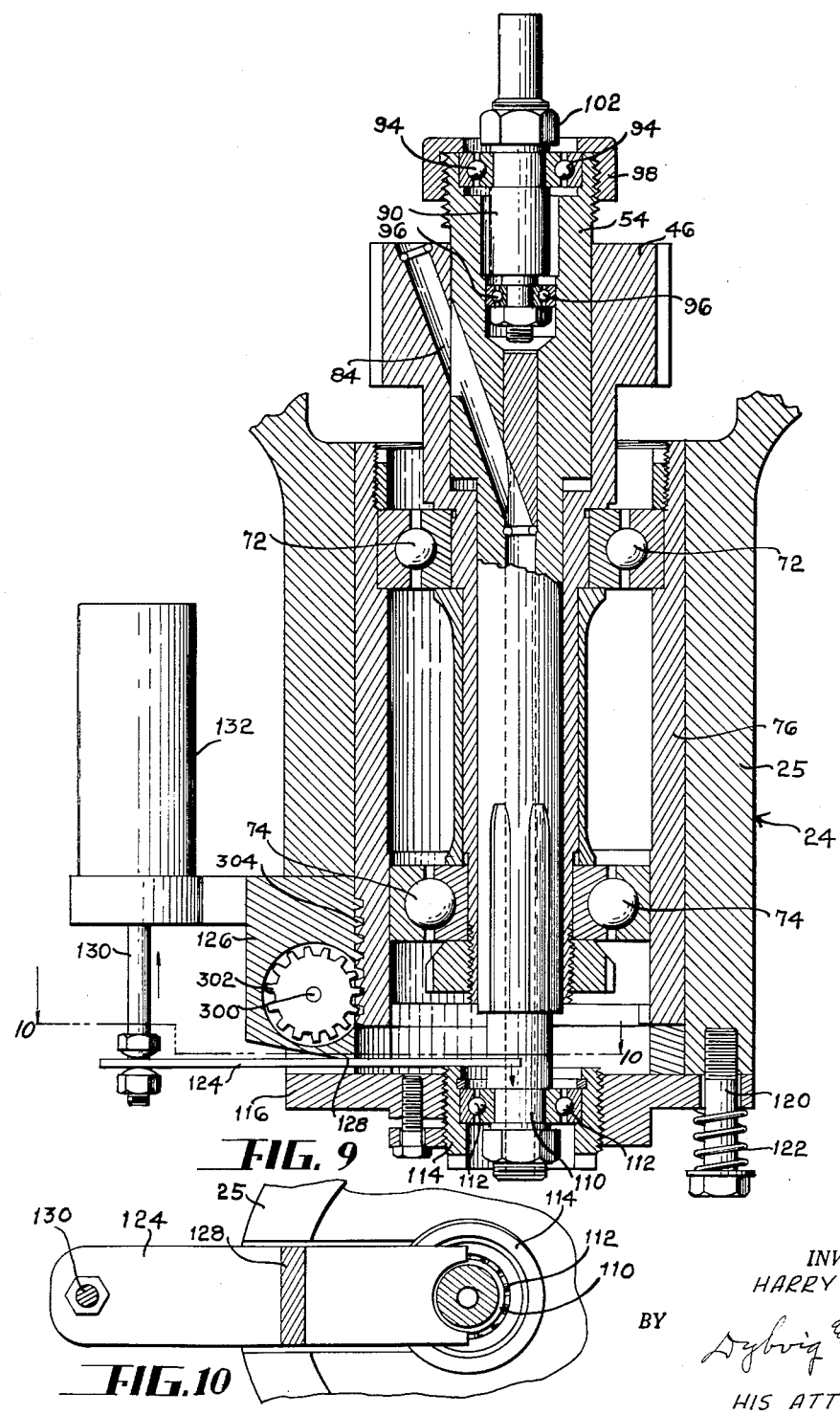

United States Patent Office 2,942,793
Patented June 28, 1960

2,942,793
MULTIPLE COIL WINDING MACHINE

Harry W. Moore, 3710 Tangier Terrace, Sarasota, Fla.

Filed Apr. 12, 1957, Ser. No. 652,603

10 Claims. (Cl. 242—13)

This invention relates to a multiple coil winding machine for use in winding a plurality of coils simultaneously, whether the coils are on parallel planes or not.

In winding coils, such as coils for armatures, it is desirable to obtain speed. That being the case, a plurality of coils are preferably wound simultaneously. When the coils lie in non-parallel planes, difficulty in obtaining a suitable drive mechanism has been encountered, in that the various spindles may form acute or obtuse angles with respect to each other.

An object of this invention is to provide a multiple coil winding machine by the use of a link-like belt drive, so that the several spindles or fliers used in winding the coils are rotated in synchronism with each other, the relative position of the several spindles or fliers being such that they do not interfere with each other even though their paths of rotation may overlap.

Another object of this invention is to provide accurate adjustment of the fliers about their angle of rotation, so as to position the adjacent convolutions side by side, thereby manufacturing a coil wherein the maximum number of turns are laid in a given space.

Another object of this invention is to provide a device for releasing the form upon which the coils are wound, withdrawing the form and the wound coils, rotating the withdrawn forms, so as to twist the wires between the withdrawn form and the new form that is inserted into position and then chucking and holding the new form in readiness for the winding of the coils on this form, the wires extending from one coil to the other being severed while the coils are being wound on the succeeding form.

Other objects and advantages reside in the construction of parts, the combination thereof, the method of manufacture and the mode of operation, as will become more apparent from the following description.

Referring to the drawings, Figure 1 is a perspective view of the drive mechanism, with parts broken away.

Figure 4 is a fragmentary, enlarged view of the mechanism used in removing the wound coils.

Figure 5 is an enlarged view of the mechanism for inserting a new coil into the machine.

Figure 6 is a side elevational view of the mechanism shown in Figure 4, with parts broken away.

Figure 7 is another view similar to that shown in Figure 6, but showing the gripper jaws for engaging the shaft of the form in open position.

Figure 8 is an enlarged cross sectional view of a flier and the form held in position, taken substantially on the line 8—8 of Figure 1.

Figure 9 is a cross sectional view, taken substantially on the line 9—9 of Figure 11, with parts broken away and the chuck per se being removed.

Figure 10 is a detail view of the mechanism used in releasing the chucks, taken substantially on the line 10—10 of Figure 9.

Figure 1:
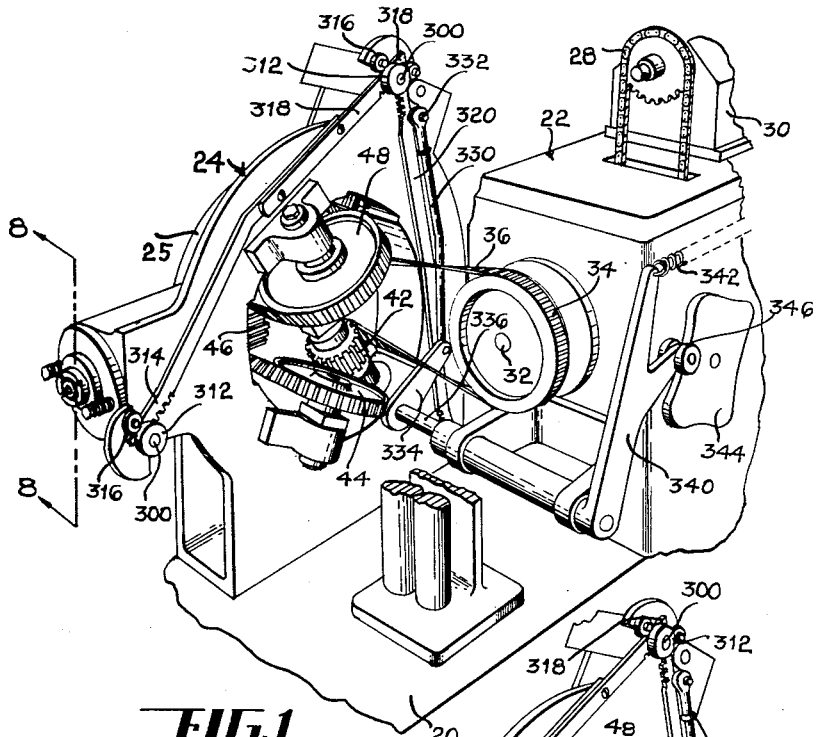

The coil winding machine is mounted upon a suitable base or bed 20 and consists of a housing 22, a coil winding assembly 24 and a retracting mechanism 26. The housing 22 encases an electric motor, a combined clutch and brake mechanism used in connecting and disconnecting the fliers, as will appear more fully later and, it also includes a chain drive mechanism 28, used in driving the control mechanism located in a housing 30.

Figures 2, 3:
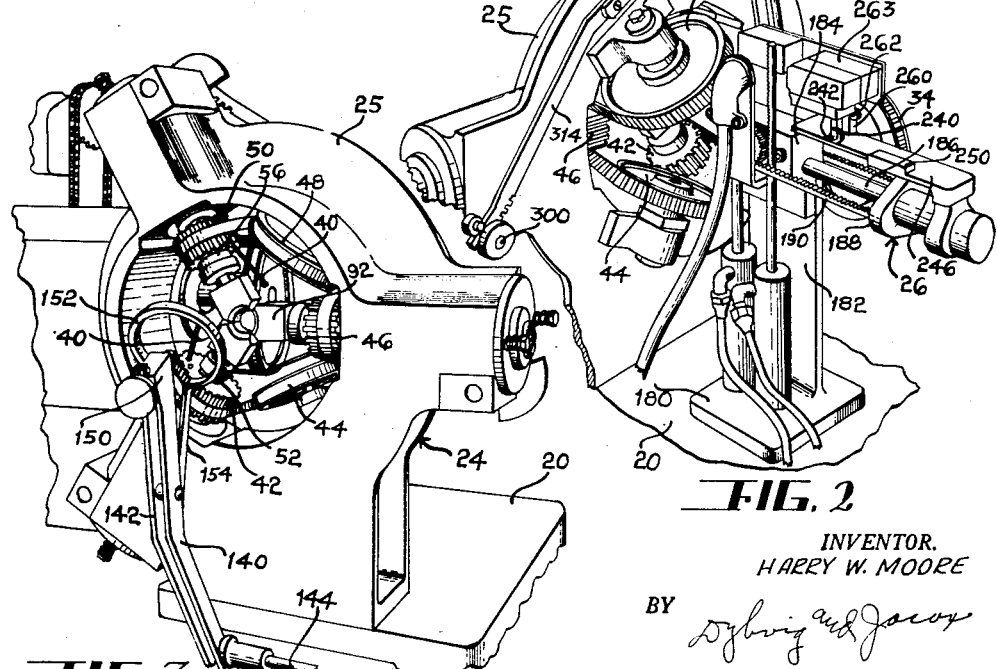
Figure 2 is another perspective view, with the motor drive mechanism removed and other parts removed for the purpose of clearness.
Figure 3 is a perspective view, as viewed from the left of Figures 1 and 2.

The driving mechanism is connected by a shaft 32 to a belt pulley 34 for driving what might be referred to as a link belt or a toothed belt 36 that is quite flexible, used in driving a plurality of fliers 40, shown in Figures 3 and 8. The belt 36 engages a toothed sprocket or gear 42, then it passes over an idler 44, from whence it drives a toothed gear 46 over an idler 48, driving a sprocket or gear 50. The gears 42, 46 and 50 are mounted upon shafts 52, 54 and 56 respectively. The idlers 44 and 48 are mounted upon stub-shafts 58 and 60. Each of the gears 42, 46 and 50 supports a flier 40. Only one of the shafts has been shown in detail, namely, the shaft 54. As clearly shown in Figures 1, 2, 3 and 5, the gear 34 and the idlers 44 and 48 are each provided with belt retaining flanges to hold the belts 36 in position.

As clearly seen in Figure 8, the gear 46 is provided with a quill 70 that is splined in the shaft 54. This quill 70 is mounted in roller bearings 72 and 74, the outer races of which are mounted in a tubular sleeve 76. The shaft 54 is hollow, so as to provide a passage for a wire 80 used in winding a form 82. The wire 80, upon leaving the shaft 54, passes through a diagonally disposed passage 84. This passage is fairly large, so as to permit relative movement between the shaft 54 and the quill 70 without pinching the wire 80. The upper end of the shaft 54, as viewed in Figure 8, supports a stub-shaft 90. As best seen in Figure 3, the end of the stub-shaft 90 supports a chuck 92 having an arcuate face adapted to engage a form, such as an armature core. This stub-shaft 90 is mounted in roller bearings 94 and 96 in the outer end of the shaft 54, so that the shaft 54 may rotate without rotating the stub-shaft 90 and the chuck 92. A suitable collar 98, threadedly engaging the end of the shaft 54, is used in clamping the outer race of the roller bearing 94 to the outer end of the shaft 54. It is to be noted that the inner race of the roller bearing 94 is positioned between a shoulder 100 on the stub-shaft 90 and a threaded collar 102, threadedly engaging the stub-shaft 90, so as to clamp this inner race in position. The roller bearing 94 thus functions both as a roller bearing and as an end thrust bearing. While winding the wire 80 upon the armature form 82, it is clamped by the chucks 92. The shaft arrangements for each of the belt gears 42, 46 and 48 are substantially identical.

Figure 11:
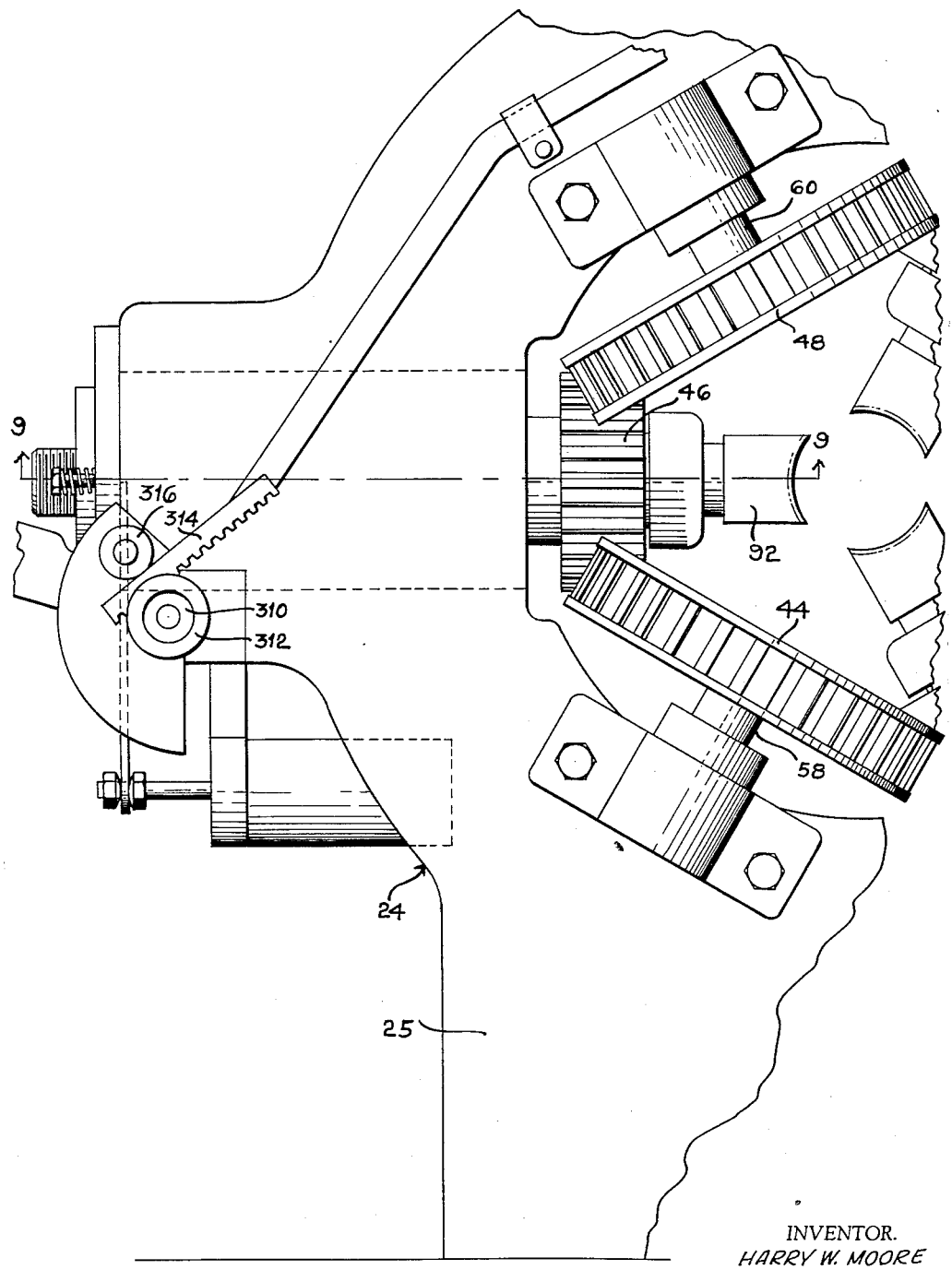
Figure 11 is an enlarged view of a portion of the machine showing the chucks used in holding the coil and the driving mechanism for the fliers, the fliers having been removed for the purpose of clearness.

After an armature has been wound, it is necessary to release the chucks 92. This release mechanism is best seen by referring to Figures 9, 10 and 11. As may best be seen by referring to Figure 9, the outer end of the shaft 54 is provided with a reduced end 110 forming a seat for the inner race of the roller bearing 112, the outer race of which is retained by a sleeve 114 threadedly engaging a disc or plate 116 non-rotatably mounted upon the housing 25 by means of bolts 120 and urged against the end of the housing 25 by compression springs 122. A level 124, having a bifurcated end, is mounted in a slot in the end of the housing 25.

As may be clearly seen by referring to Figure 9, a journal block 126 is provided with a shoulder 128, against which the lever 124 is seated. This shoulder functions as a fulcrum point for the lever 124. The outer end of the lever 124 is connected to a piston rod 130 mounted in a hydraulic or pneumatic cylinder 132, so that when the cylinder 132 is energized, the piston rod 130 is actuated in the direction of the arrow shown in Figure 9, so as to move the shaft 54 outwardly a slight distance, to release the chuck 92, engaging the armature that is being wound. All of the chucks 92 are actuated simultaneously, that is, there is an identical lever mechanism and pneumatic or hydraulic cylinder for each of the fliers. The piston rod 130 is actuated at the completion of the winding operation, so as to permit withdrawal of one form and inserting another in its place. As soon as the cylinder 132 is de-energized, the springs 122 actuate the shafts 54 inwardly, so as to cause all of the chucks to engage a new form inserted between the chucks in readiness for a succeeding operation.

The particular form used for receiving the windings in the device disclosed herein is an armature 82. This armature has three coils. In Figure 5, the chucks do not support an armature. However, an armature 82 is mounted in an armature loading device including a pair of arms 140 and 142 attached to a shaft 144 mounted for oscillation in brackets 146 and 148. By a suitable mechanism, not shown, the armature, when mounted in the holding head 150 supported upon the arms 140 and 142, can only be held in a position such that when the armature is advanced into the opening between the chucks 92, the slots for the coils will be positioned between adjacent chucks 92. The arms 140 and 142 support a ring 152 mounted upon an arm 154 that is mounted in spaced relation from the armature and held in this position by a suitable compression spring, not shown. As the armature is advanced into position between the chucks, the ring 152 engages the flat faces of each of the chucks, so as to cause the flat faces of the chucks to lie in a common plane. The chucks, as has already been described, are free to rotate in their mountings and in withdrawing an armature, it is a very easy matter to cock one or more of the chucks slightly. When this takes place, the ring 152 aligns the chucks, so that the chuck faces will register in proper relation with the armature. The spring biasing the arm 154 and the ring 152 away from the head 150 yields when engaging the faces of the chucks 92, so as to exert a yielding force against the faces of the chucks. The head 150 may be manually moved, so as to insert the armature into the chucks, or it may be driven in synchronism with the control mechanism used in controlling the sequence of operation of the machine.

As may be seen by referring to Figure 5, the shaft 144 supports arms 160, 162 and 164 associated with micro-switches 168, 170 and 172 respectively. The lower end of the arm 140, when inserting the armature 82 into the chucks, engages a micro-switch 174. The operation of these micro-switches will be described more fully when describing the sequence of operation.

After a coil has been wound, it is then withdrawn by the retracting mechanism 26, which will now be described. As best seen by referring to Figures 2 and 4 to 7 inclusive, this retracting mechanism includes a sub-base 180 mounted upon the bed 20 and provided with an upright standard 182. The standard 182 supports a bracket or block 184 provided with a horizontally disposed aperture receiving a tubular sleeve 186. This tubular sleeve 186 has fixedly mounted thereto a cross bar 188 attached to a pair of rack members 190 meshing with pinions 192 mounted upon a transverse shaft 194 and driven by a rack 196 meshing with a pinion 198 keyed to the shaft 194. The rack 196 is attached to a piston mounted in a cylinder 200. The tubular sleeve 186 is mounted for reciprocatory movement through the block 184.

In Figure 4 the tubular sleeve is shown in a retracted position. In Figure 6 it is shown in the extended position. This sleeve 186 supports a bracket 210 having pivotally mounted thereto a pair of jaws 212. These jaws are normally biased into open position by a garter spring 214 engaging the rear end of the jaws 212. A rod 216, best shown in Figure 7, projects into the tubular sleeve and is actuated by means of a piston 218 mounted in a pneumatic cylinder or hydraulic cylinder 220. The end of the rod 216 opposite the piston 218 is fixedly mounted to a cam member 222 having a pointed end 224 projecting between the rear ends of the jaws 212. As the cylinder 220 is supplied with compressed air or hydraulic fluid, the rod 216, as viewed in Figure 7, is actuated towards the left, so as to force the tapered end 224 of cam member 222 between the jaws, to cause the jaws to move into closed position, as shown in Figures 4 and 6.

When the armature has been wound, the cylinder 200 is supplied with hydraulic fluid, actuating the rack 196 downwardly, as shown in Figure 4, causing the pinions 192 to rotate in a clockwise direction, as shown in this figure, to thereby advance the sleeve 186 towards the armature that is held in the chucks. When the sleeve 186 has been advanced into the extreme forward position, fluid or air pressure is supplied to the cylinder 220, so as to actuate the piston 218 towards the right, as viewed in Figures 6 and 7, to close the jaws 212, engaging the end of the shaft of the armature 82. The jaws 212 are held in closed position while the tubular sleeve 186 and the jaws 212 are retracted. The sequence of operations is such that the chucks 92 are actuated into the released position immediately after the gripper jaws 212 have engaged the end of the armature shaft, but before the tubular sleeve 186 and the gripper jaws 212 are retracted. The cylinder 220 continues to be energized during the period that the armature is retracted.

For some purposes it is desirable to rotate the armature as it is retracted, so as to twist the wires extending from the fliers to the armature. This takes place before the wires are severed. Some users of the coils may not desire to twist the wires, while others may desire to do so. The mechanism for twisting the wires will now be described.

This mechanism includes a cylinder 230 mounted on the sub-base 180 and provided with a piston rod 232 provided with rack teeth engaging a pinion 234 that is splined or non-rotatably mounted on the tubular sleeve 186, the tubular sleeve 186, however, being mounted for reciprocatory movement through the pinion 234. By energizing the cylinder 230 so as to actuate the piston rod 232, the pinion 234 and the tubular sleeve 186, together with the clamping jaws 212 and the armature mounted therein are rotated. This rotation takes place during the period of time that the armature is withdrawn from the position shown in Figure 6 until it has been retracted to the extreme outer position.

A switch arm 240, which is provided with a roller 242 traveling on a horizontally disposed bar 246 mounted for reciprocatory movement with the tubular sleeve 186, engages a switch actuating plate 250 mounted on top of the bar 246, so that as the armature is withdrawn, the roller 242, upon engaging the switch plate 250, actuates the control, supplying fluid to the cylinder 230, so as to rotate the tubular sleeve 186 when the bar 246 is retracted. When the bar 246 is advanced, with the tubular sleeve 186 toward the new armature, the switch actuated by the roller 242 traveling on the switch plate 250 will not energize the switch.

A block 260, which is mounted on top of the bar 246, actuates a roller 262 to release the piston 218 whenever the armature has been retracted to its home position, to thereby withdraw the rod 216 and the pointed end 224 from between the rear end of the jaws 212 to release the armature.

A wire traverse mechanism for uniformly winding all the coils will now be described. As may best be seen by referring to Figures 1, 2, 9 and 11, each of the journal blocks 126 has journalled therein a shaft 300 supporting a pinion 302 meshing with the teeth 304 on the tubular sleeve 76. Each of the shafts 300 has mounted thereon a pinion 310 on the side of a collar 312. This pinion 310 meshes with a rack bar 314 held in engagement by means of a roller 316. The opposite end of the rack bar 314 is provided with a rack bar 318 meshing with another pinion on another shaft 300. A rack bar 320, similar to the rack bars 314 and 318, this rack bar 320 having toothed sections in each end thereof, interconnects the third sleeve 76, so that when one sleeve moves, all of the sleeves move. A pitman 330 has one end pivotally attached at 332 to the rack bar 320 and the other end attached to an arm 334 keyed to a shaft 336. The shaft 336 has mounted thereon an arm 340 biased in a clockwise direction, as viewed in Figure 1 by a tension spring 342, and actuated in counterclockwise direction by a lobular cam 344 engaging a cam follower 346 mounted upon the arm 340. The lobular cam 344 is rotated by the driving mechanism for driving the fliers. By this arrangement, the tubular sleeves 76 are reciprocated and with them the fliers are reciprocated during the winding operation, so that the fliers also function at a coil layer traverse mechanism. In the event the coil is laid in V-slots or tapered slots, the lobular cam 344 is so designed that the number of layers in a coil increases as the slot widens. Whenever the coil winding machine is de-energized and the brake applied, the lobular cam 344 is also stopped.

*Mode of operation*

The fliers wind three sets of coils. These fliers are driven by the flexible belt 36, which is provided with teeth meshing with the gear teeth or sprocket teeth of the gears 42, 46 and 50, supporting the fliers. These fliers are so spaced relative to each other that they always clear each other in spite of the fact that their paths of travel overlap. The fliers are caused to traverse the core or armature by the cam 344 actuating the cam follower 346 that rocks the arm 340 and actuates the shaft 336, so as to oscillate the pitman 330 which actuates members 320 and 314 to rotate the shafts 300 first in one direction then in the opposite direction, so as to actuate the pinions 302 meshing with gear teeth and the tubular sleeve 76 that supports the gears 42, 46 and 50. These gears are mounted for rotary movement in the sleeve 76 without axial movement in the sleeve 76, so that as the sleeve 76 is reciprocated by the gears 302, the fliers are moved back and forth, so as to lay the windings in the armature slots in an orderly manner. In the housing 30 there is a control mechanism that is conventional as far as coil winding machines are concerned to stop the fliers when the decided number of windings have been laid in each slot.

While the armature 82, held by the chucks 92, is wound, a new armature core is placed by the operator in the loader 150. This armature in the loader 150 is in readiness for winding when the winding of the armature held by the chucks is completed.

The attendant places an armature 82 in the loader or head 150, then actuates the loader towards the chucks 92. As best seen in Figure 5, the shaft 144 is attached to the loader. The arm 160 engaging the micro-switch 168 is a safety interlock that positively locks out the clutch so as to prevent an accident as the loader proceeds towards the chuck. A micro-switch 174 is closed as it closes the chucks 92, so as to firmly grip the armature. As the unloader retracts, the micro-switch 174 is opened and a clutch driving the fliers is then closed after the loader has returned sufficiently far to release the arm 160 from its micro-switch.

As the arm 162 closes the micro-switch 170, fluid is supplied to the cylinder 220 to actuate the rod 216 to the right, as viewed in Figure 6, to permit the garter spring 214 to open the jaws 212. This is followed by the arm 164 engaging the micro-switch 172 to energize the cylinder 200, causing the rack member 196 to be lowered, thereby rotating the pinions 192 in a clockwise direction, as viewed in Figure 4, to advance the tubular sleeve 186 and the parts associated therewith toward the coil winding machine. Thereafter, the micro-switch 172 is closed by the arm 164. This opens the chucks and at the same time reverses the supply of fluid to the cylinder 220 to cause the gripper jaws to close, engaging the end of the shaft of the armature 82 that has been wound. The switch actuating plate 250 engages the roller 242 to reverse the flow of hydraulic fluid to the cylinder 200 to retract the tubular sleeve 186 and withdraw the wound armature 82 from the chucks, the withdrawal taking place on the side of the chucks opposite the armature loading head 150. As this mechanism moves into the position shown in Figure 2, the projection 260 engages the roller 262 actuating a micro-switch 263 that energizes the cylinder 230 to rotate the armature that is being withdrawn to twist the wires.

By this time the new armature core 82 has been inserted between the chucks 92 and as it is inserted, the lower end of the arm 140 engages the micro-switch 174, which causes the chucks 92 to be closed and sets the coil winding machine in readiness for a succeeding winding operation. However, the machine cannot start until the loader 150 has moved into such a position that the arm 160 has disengaged the micro-switch 168, to release the safety interlock which permits the clutch to be engaged. The succeeding armature core is then wound. The operation as set forth above for unloading the wound armature and reloading another armature core is then repeated.

Although the coil winding machine has been shown in connection with the winding of an armature core, any other suitable core for use with multiple coils could be wound by the device shown herein.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A coil winding machine for winding a plurality of coils simultaneously upon a core having a plurality of coil receiving slots, the combination including means for supporting the core, means for winding coils upon the core, said last mentioned means including a plurality of hollow shafts, each of said shafts having a centrally located wire passage and an angularly disposed wire passage, a plurality of fliers, one for each of the coils to be wound, means for rotatably supporting the shafts and the fliers, the shafts being mounted in the supporting means for longitudinal movement independent of the fliers, a plurality of toothed gear members, one for each shaft, means for fixedly supporting the toothed gears for rotation with the shafts, and driving means including a flexible member having means for positively engaging the teeth of the gears for driving the fliers in synchronism.

2. A coil winding machine according to claim 1, wherein the means for rotatably supporting the shaft and the fliers includes a frame having a plurality of radially disposed bores, a plurality of tubular sleeves non-rotatably mounted in the bores of the frame, means for moving the sleeves longitudinally in the bores, and means for supporting the hollow shafts in the tubular sleeves.

3. A coil winding machine according to claim 1, wherein the means for rotatably supporting the shaft and the fliers includes a frame having a plurality of radial bores, one for each of the hollow shafts, sleeves non-rotatably mounted in the bores, quills rotatably mounted in the sleeves, and means for non-rotatably mounting the shafts in the quills, said shafts having a relative longitudinal movement with respect to the quills.

4. A coil winding machine for winding a plurality of coils simultaneously upon a core having a plurality of coil receiving slots, the combination including a frame having a centrally located opening and a plurality of radially disposed non-parallel bores, the bores lying in a common plane and angularly disposed with respect to each other, a plurality of non-parallel shafts, one for each of the bores, means for rotatably mounting the shafts in the bores, means mounted on the shafts for winding the coils on the core, and means for driving all of the shafts in synchronism so that the coils are wound simultaneously, said means including toothed gear members mounted for rotation with the shafts and a flexible driving member having means for engaging the teeth of the gear members for driving the shafts.

5. A coil winding machine for winding a plurality of coils according to claim 4, wherein idlers mounted on stub shafts guide the flexible member in passing from one gear to another gear, said stub shafts bisecting the angle formed by adjacent first mentioned shafts to thereby drive the gears.

6. A coil winding machine for winding a plurality of coils according to claim 4, wherein chucks are mounted upon stub shafts journalled in the ends of the first mentioned shafts, the chucks engaging the core upon which the coils are wound, and means for moving said first mentioned shafts axially to release the chucks from the core to permit removal of the wound core and insertion of an unwound core.

7. A coil winding machine for winding a plurality of coils according to claim 4, wherein the means mounted on the shafts for winding coils on the core includes fliers mounted on quills surrounding the shafts, the quills being mounted for axial adjustment to thereby adjust the fliers with respcet to the core to lay the windings of the coil and means responsive to the driving means for gradually reciprocating the quills during the winding operation.

8. A coil winding machine for winding a plurality of coils simultaneously upon a core according to claim 4, wherein means including gripper jaws engage the core for removing the core when wound and means for inserting an unwound core in winding position, said last mentioned means including a pivotally mounted lever for inserting the unwound core and for actuating the control mechanism.

9. A coil winding machine for winding a plurality of coils simultaneously upon a core having a plurality of radially disposed coil receiving slots, the combination including means for supporting the core, means for winding coils upon the core, said last mentioned means including a plurality of hollow non-parallel shafts having a centrally located wire passage and an angularly disposed wire passage, a plurality of fliers rotating in non-parallel planes, one for each of the coils to be wound, means for rotatably supporting the shafts and the fliers, said fliers being mounted for movement parallel to the axis of rotation thereof, means for reciprocating the fliers for laying the windings in the slots, a plurality of toothed gear members, one for each shaft, means for supporting the gear members on the shafts for rotation therewith, and driving means including a flexible member having means for positively engaging the teeth of the gears for driving the fliers in synchronism.

10. A coil winding machine for winding a plurality of coils simultaneously upon a core having a plurality of radially disposed coil receiving slots, the combination including means for supporting the core, a plurality of non-parallel hollow shafts, said core supporting means including a plurality of stub shafts, one for each of the hollow shafts, said stub shafts being journalled in the ends of the hollow shafts, chucks mounted on the stub shafts for holding the core, means for winding coils upon the core, said last mentioned means including said plurality of hollow shafts having a centrally located wire passage and an angularly disposed wire passage, a plurality of fliers rotating in non-parallel planes, one for each of the coils to be wound, means for rotatably supporting the hollow shafts and the fliers, a plurality of toothed gear members, one for each hollow shaft, means for supporting the gear members on the hollow shafts for rotation therewith, and driving means including a flexible member having means for positively engaging the teeth of the gears for driving the fliers in synchronism.

References Cited in the file of this patent

UNITED STATES PATENTS

| | | |
|---|---|---|
| 1,255,712 | Crane | Feb. 5, 1918 |
| 2,306,855 | Allen | Dec. 29, 1942 |
| 2,627,379 | Moore | Feb. 3, 1953 |